United States Patent [19]

Sievers

[11] Patent Number: 4,617,956

[45] Date of Patent: Oct. 21, 1986

[54] CONTROL MEANS FOR GROUND HYDRANTS

[76] Inventor: Otto H. Sievers, 811 E. Milwaukee, Storm Lake, Iowa 50588

[21] Appl. No.: 815,379

[22] Filed: Dec. 31, 1985

Related U.S. Application Data

[63] Continuation-in-part of Ser. No. 531,480, Sep. 12, 1983, abandoned.

[51] Int. Cl.⁴ .......................... F16K 31/02; E03B 9/04
[52] U.S. Cl. .................................... 137/272; 137/291; 137/296; 137/624.13; 251/129.18; 251/129.2
[58] Field of Search ............... 137/272, 291, 292, 296, 137/624.11, 624.13, 624.15; 251/129.18, 129.2, 231, 251

[56] References Cited

U.S. PATENT DOCUMENTS

| | | | |
|---|---|---|---|
| 2,148,703 | 2/1939 | Martin | 251/129.2 |
| 2,772,067 | 11/1956 | Wilson | 137/624.11 |
| 3,444,892 | 5/1969 | Doyle et al. | 137/624.15 |
| 3,506,034 | 4/1970 | Branton | 251/251 |
| 4,071,047 | 1/1978 | Greene | 251/129.2 |
| 4,372,339 | 2/1983 | Anderson | 137/292 |
| 4,412,557 | 11/1983 | Schmid | 137/624.13 |

*Primary Examiner*—George L. Walton

*Attorney, Agent, or Firm*—Zarley, McKee, Thomte, Voorhees & Sease

[57] ABSTRACT

A control means for ground hydrants is disclosed for use in combination with a conventional freezeless ground hydrant having an elongated vertical housing with a valve means at the lower end thereof to control the inflow of pressurized water. The valve means includes an elongated control rod that extends upwardly through the housing. A fluid passageway extends through the housing and terminates in an exit port. The control rod for the valve means is spring loaded in a downward or closed position by a tension-adjustable spring secured thereto. A solenoid means is mounted upwardly of the rod and is operatively secured thereto. An electrical timer is connected in series with the solenoid. When the solenoid is electrically actuated, the solenoid will pull the rod upwardly to open the valve in the bottom of the housing. When the electrical timer de-energizes the solenoid, the spring adjacent the rod will cause the valve to close.

An alternate form of the invention utilizes a lever mechanism between the solenoid and the rod controlling the valve means to allow the solenoid to more efficiently move the rod into an upward position.

3 Claims, 4 Drawing Figures

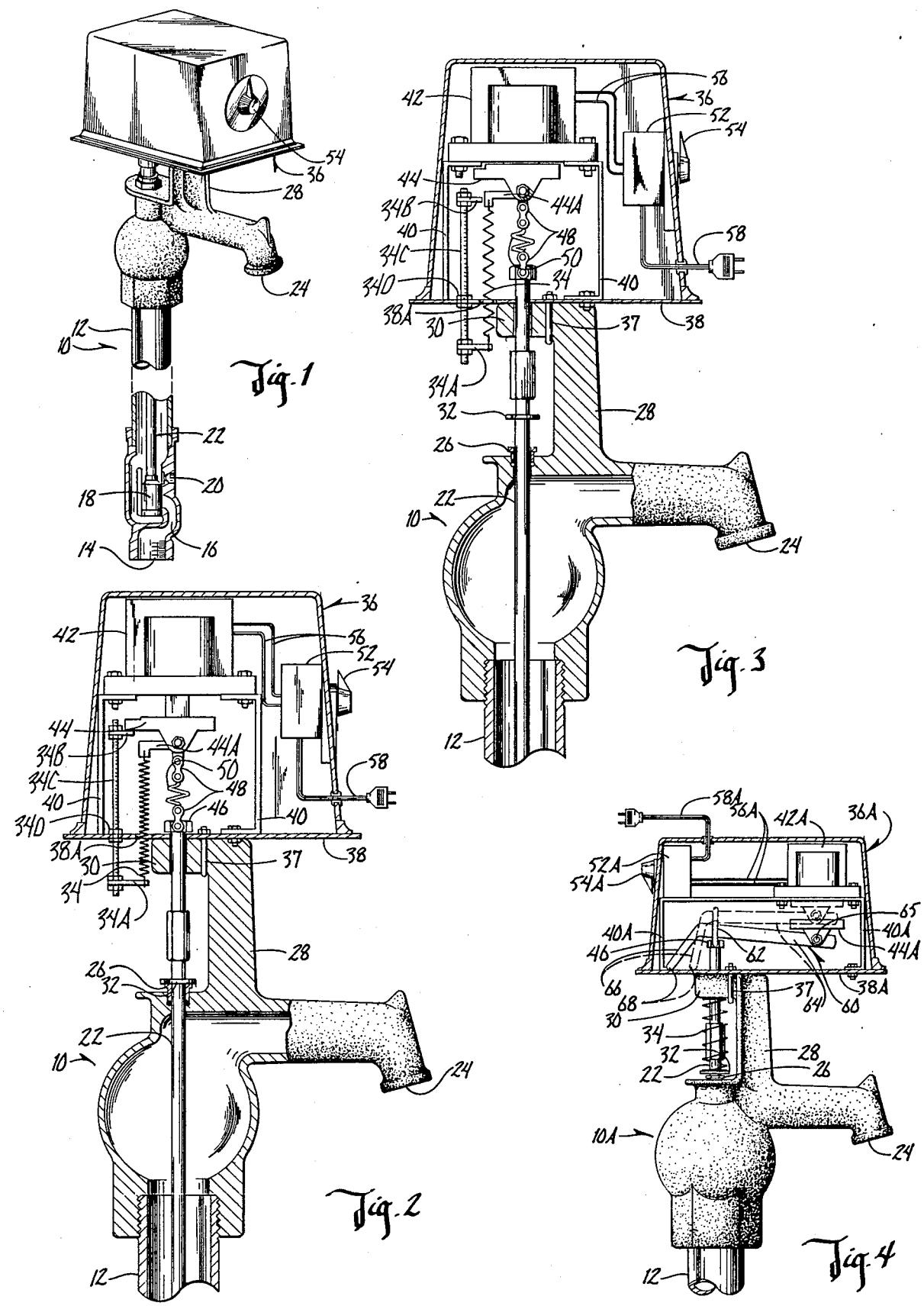

4,617,956

CONTROL MEANS FOR GROUND HYDRANTS

This application is a continuation-in-part application from co-pending application Ser. No. 531,480, filed Sept. 12, 1983, now abandoned.

BACKGROUND OF THE INVENTION

Freezeless ground hydrants are often used in conjunction with livestock facilities on American farms. These conventional hydrants normally comprise an elongated vertical housing with a valve means in the lower end thereof which controls the flow of water into the housing from a pressurized source of water. A control rod extends upwardly through the housing from the valve means and is normally actuated manually by a handle connected to the upper end of the rod.

Hydrants of this type are often connected by a hose or the like to a livestock watering tank for cattle, hogs and other types of livestock. In some instances, the hydrants can be directed into a watering tank without the use of a hose. While such hydrants are very useful to the livestock operator, the manually operated hydrants have some serious shortcomings. First of all, if the tanks become empty while the operator is not present, the livestock using the tank are without water for a period of time.

Occasionally, an operator will open a hydrant to fill a tank and then will become occupied with other chores while the tank is being filled. If the operator fails to remember to return to the hydrant to shut it off, the tank will overflow resulting in a loss of water which could even result in a given well being pumped dry.

It is, therefore, a principal object of this invention to provide a control means for ground hydrants which will permit the hydrant to be turned on electrically.

It is a further object of this invention to provide a timer mechanism as a part of the control means for ground hydrants so that the ground hydrants can be electrically opened for a fixed period of time and at given intervals to adequately take care of the water needs for livestock.

A further object of the invention is to provide a control means for ground hydrants which can have a spring adjustably secured to the valve rod of the hydrant so that the control means can be adapted for use on a variety of hydrants.

A still further object of this invention is to provide a control means for ground hydrants which is economical of manufacture, durable of use, and refined in appearance.

These and other objects will be apparent to those skilled in the art.

BRIEF SUMMARY OF THE INVENTION

In the preferred embodiment of the invention, an electrical solenoid is operatively connected to the control rod for a ground hydrant. When the solenoid is energized, the control rod is pulled upwardly to open the hydrant. When the solenoid is de-energized, a tension-adjustable spring on the hydrant adjacent the control rod causes the control rod to move downwardly to close the inlet valve.

An electrical timer is connected in series with the electrical solenoid so that the period of time that the solenoid is elecrically energized can be controlled as well as the interval of time that elapses between periods when the solenoid is energized.

An alternate form of the invention utilizes a lever means between the solenoid and the control rod for the hydrant to improve the efficiency of the solenoid.

BRIEF DESCRIPTION OF THE DRAWINGS

FIG. 1 is a partial perspective view of the ground hydrant of this invention with a portion thereof being broken away and shown in section;

FIG. 2 is a partial sectional view of the device of FIG. 1 shown at an enlarged scale and showing the hydrant in a closed condition;

FIG. 3 is a sectional view similar to that of FIG. 2 but shows the components in the position when the electrical solenoid is energized and showing the hydrant in an opened condition; and FIG. 4 is a sectional view similar to that of FIG. 2 but showing an alternate form of the invention.

DESCRIPTION OF THE PREFERRED EMBODIMENT OF THE INVENTION

The numeral 10 generally designates the hydrant of this invention which includes a pipe housing 12 having a connection 14 at its lower end adapted to be connected to a source of water under pressure. The connection 14 is normally located in the ground at a distance below the normal frostline.

Housing 12 has a passageway 16 which is adapted to be opened or closed by valve 18. FIG. 1 shows the valve 18 in a closed condition. When valve 18 is raised, water flows therearound and moves upwardly through housing 12. A drain port 20 is located in housing 12 and is adapted to drain the housing above valve 18 when the valve is in its closed position. (The lower end of the pipe housing is normally located in a quantity of sand or gravel.)

A valve rod 22 extends upwardly from valve 18 and extends beyond the upper end of housing 12. A conventional fluid outlet 24 is located on the upper end of the housing. A bushing 26 is located in the upper end of the housing and valve rod 22 slidably extends therethrough.

A bracket 28 is integrally formed with the upper end of housing 12 and includes a bearing 30 through which the rod 22 also slidably extends. A washer 32 is welded or otherwise secured to rod 22 and is adapted to rest on bearing 26 (see FIG. 2) when the valve 18 is in its closed position. As will be discussed hereafter, spring 34 normally urges rod 22 downwardly, and thus spring 34 normally maintains valve 18 in a closed condition.

Control housing 36 is secured to bracket 28 by a U-bolt 37 which extends through bottom 38 of the control housing. Control housing 36 includes a bracket 40 to which a conventional electrical solenoid 42 with a conventional solenoid plunger 44 is secured.

A nut 46 is secured to the upper end of rod 22 and a chain 48 connects nut 46 with solenoid plunger 44. A spring 50 is imposed within the length of chain 48.

An L-shaped arm 44A is secured to plunger 44 and supports the upper end of spring 34. The spring 34 extends downardly through a suitable hole 38A in bottom 38 and is connected at its lower end to bar 34A. A bar 34B is connected to threaded rod 34C which extends vertically through aligned apertures in bars 34A, bottom 38, and bar 34B. Lock nuts 34D on rod 34C permit bar 34A to be longitudinally adjusted with respect to bar 34B, whereby the length, and hence the tension on spring 34 can be selectively adjusted. Bar 34B serves as a stop to limit the lower movement of plunger 44. The adjustability of spring 34 allows the device of this invention to be applied to various hydrants despite variations in valve friction.

A conventional electrical timer 52 is mounted within control housing 36. A conventional time control 54 extends from timer 52 through the control housing 36 to permit the timer to be selectively adjusted both as to the time that electrical energy will pass through the timer 52, and also as to the intervals between periods when energy is required. The timer 52 is connected by leads 56 to solenoid 42. Similarly, timer 52 has connector leads 58 which extend to a source of electrical power.

An alternate form of the invention is shown in FIG. 4. This form of the invention merely shows an alternate type of connection between the solenoid and the control rod for the valve. The hydrant 10A of FIG. 4 is essentially identical to the hydrant 10 of FIGS. 1 through 3. A control housing 36A having a bottom 38A is shown in FIG. 4 along with a solenoid 42A having a solenoid plunger 44A. Timer 52A has a timer control 54A. The foregoing components are essentially identical in structure and function to the components bearing like numbers in FIGS. 1 through 3.

An L-shaped lever 60 extends through a U-shaped yoke 62 secured to the upper end of rod 22. Lever 60 has a horizontal arm 64 that is secured by one of its ends by pin 65 to the lower end of solenoid plunger 44A. The other end of lever 60 is comprised of diagonal arm 66 which has a lower end 68. End 68 of diagonal arm 66 slidably engages the bottom 38A of control housing 36A.

The normal operation of the device of FIGS. 1 through 3 is as follows: The connector lead 58 is connected to a source of electrical energy. The timer 52 is adjusted in conventional manner by timer control 54 so that electrical energy will be provided to solenoid 42 for the desired period of time at desired intervals. Thus, for example, the livestock operator might set the timer to come on each two hours for a period of 15 minutes.

The various components are normally in the position shown in FIG. 2 when the solenoid 42 is not energized. The tension on spring 34 can be adjusted to match the friction on the valve 18. Upon becoming energized, the solenoid plunger 44 will move from the lower position of FIG. 2 to the upper position of FIG. 3. The plunger 44 will overcome the spring 34 which will become compressed. The spring 50 is stronger than the spring 34 and while it does provide some cushioning effect between the solenoid and the rod 22, the spring 50 will not substantially elongate as solenoid plunger 44 moves upwardly.

The lifting of rod 22 as described above causes valve 18 to open, and the pressurized water will flow through the hydrant and out of outlet 24. When the timer 52 cuts the flow of electrical energy to solenoid 42, the solenoid will move back to the position shown in FIG. 2 as the spring 34 expands to move the rod 22 from the position in FIG. 3 to the position in FIG. 2. This action serves to cause the valve 18 to move to the position of FIG. 1 to close passageway 16.

The device in FIG. 4 operates in a similar fashion except that lever 60 permits a more efficient action of the solenoid 42A by utilizing the leverage of lever 60 to raise the rod 22. The spring tension adjustment means of FIGS. 2 and 3 can be imposed on the device of FIG. 4.

When solenoid 42 is not electrically energized, the lever 60 is in the position shown by the solid lines in FIG. 4. When the solenoid is energized, the horizontal arm 64 is moved to the position shown by the dotted lines. The end 68 of diagonal arm 66 slides across the bottom 38A of control housing 36A to a more upright position. This causes the horizontal arm 64 to rise in elevation, and this portion of the lever then bears against yoke 64 causing it to rise, which in turn raises rod 22. This serves to open valve 18 in the manner described hereinbefore.

It is, therefore, seen that this invention will permit a livestock operator to adapt various hydrants for use with a watering tank wherein water will be provided to the tank at the intervals and for a period of time tailored to the watering needs of the stock being served. It is, therefore, seen that this invention will achieve at least its stated objectives.

I claim:

1. In combination with a freezeless ground hydrant having an elongated vertical housing, a valve means at the bottom of said housing adapted to be in communication with a source of water under pressure, a drain means adjacent said valve means so that water in said hydrant above said valve means will drain from said housing when said valve means is in a closed position, the bottom of said housing normally dwelling in the ground below the frost level, and the upper end of said housing dwelling above the ground level, a water exit port at the upper end of said housing in communication with said valve means to permit the flow of water through and from said hydrant when said valve means is open, an actuating rod attached to said valve means and extending upwardly through said housing to the upper end thereof, the invention comprising, an electrical solenoid means on the upper end of said housing adapted to be connected to a source of electrical energy, said solenoid means having a moveable plunger, linkage means connecting said moveable plunger and said actuating rod to raise said actuating rod to open said valve means when said solenoid means is electrically energized, an electrical timer being electrically imposed between said solenoid means and said source of electrical energy so that said solenoid means can be periodically and intermittently energized, a spring means having upper and lower ends with its upper end being directly secured to said plunger; said spring means extending downwardly from said plunger in a direction parallel to said actuating rod and moveably extending through said housing with the lower end thereof dwelling outside said housing.

a threaded rod adjustably mounted on said housing and being positioned adjacent to and parallel to said spring means, said threaded rod having upper and lower ends, a horizontal bar adjustably secured to the lower end of said threaded rod and moveably along the axis of said threaded rod, the lower end of said spring means being directly connected to said horizontal bar to permit a variable tension in the spring means upon the adjustment of said horizontal bar, and said spring means adapted to lower said actuating rod to close said valve means when said solenoid means is not electrically energized.

2. The combination of claim 1 wherein a stop means is mounted on the upper end of said threaded rod and is located in the path of said plunger to limit the downward movement of said plunger.

3. The device of claim 1 wherein said lever means is L-shaped and has opposite ends, with one end being movably connected to said solenoid, and the other end slidably engaging a fulcrum surface on said housing, with said lever means being secured to said actuating rod at a point intermediate the ends thereof.

* * * * *